UNITED STATES PATENT OFFICE 2,426,264

PRODUCTION OF ALLYL ALCOHOL

George W. Fowler and John T. Fitzpatrick, Charleston, W. Va., assignors to Carbide and Carbon Chemicals Corporation, a corporation of New York No Drawing. Application January 16, 1945, Serial No. 573,136

4 Claims. (Cl. 260—632)

An improved catalytic method for the production of allyl alcohol from propylene oxide

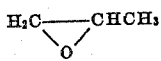

has been discovered.

It has been known for many years that the unstable ring compound, propylene oxide, undergoes isomerization to more stable compounds when heated in the presence of certain catalysts. Most commonly, heretofore, the principal isomerization product has been propionaldehyde, with only negligible amounts of allyl alcohol reported. In the presence of alumina as the catalyst, however, propylene oxide has been isomerized to yield propionaldehyde and allyl alcohol in approximately equal proportions. The formation of propionaldehyde in this reaction is undesired, since there is a considerable demand for allyl alcohol at present. For instance, esters of allyl alcohol are polymerized to form an interesting class of thermosetting resins. Aside from the relative present economic value of allyl alcohol and propionaldehyde, it is usually desirable that a chemical process produce only one principal product, since the production of that product can be curtailed or increased according to the demand without regard to the disposal of the side reaction product or products.

We have succeeded in converting propylene oxide to the desired compound allyl alcohol, while forming only small or negligible amounts of carbonyl compounds, such as propionaldehyde or acetone. We have found that lithium phosphate, unlike other phosphates, including other alkali metal phosphates, is a specific catalyst for the isomerization of propylene oxide to allyl alcohol. When propylene oxide vapors are passed over this catalyst at a suitable temperature, approximately 67 to 85% of the propylene oxide consumed is converted to allyl alcohol, and only 1 to 10% of the propylene oxide reacted is isomerized to carbonyl compounds. Thus, the chemical efficiency of the new catalytic process for making allyl alcohol may be 67 to 85%, or higher. The specific formation of allyl alcohol in the presence of lithium phosphate is all the more remarkable in that allyl alcohol is a less stable isomer of propylene oxide than are propionaldehyde and acetone, as shown by the higher heat of combustion of allyl alcohol.

The temperature of the catalyst bed is regulated depending on the yield of allyl alcohol desired. The best chemical efficiencies have been observed at yields of allyl alcohol of 15 to 20%, and under these conditions, the optimum temperature is about 230° to 270° C. However, the catalyst is active over a wider temperature range than this, and the process may be conducted, for instance, at a temperature within the range of 200° to 300° C. The reaction is exothermic, and some method for removing the heat of reaction should be provided. This may be done by carrying out the reaction in long narrow tubes having a surrounding jacket containing a fluid for the transfer of heat. In this apparatus, the entering propylene oxide vapors must be under sufficient pressure to compensate for the pressure drop in the tube. If desired, inert diluents, such as nitrogen or water vapor may be introduced with the propylene oxide, but their presence is not required.

The rate of feed of the propylene oxide does not appear to be critical, but for best results, it should be regulated according to the temperature of the catalyst bed. At temperatures of 230° to 270° C., feed rates of from one to two volumes of liquid propylene oxide at ordinary temperatures per volume of catalyst per hour have been quite satisfactory. Thus, allyl alcohol has been produced at production rates of 100 to 200 grams of alcohol per liter of catalyst per hour with good chemical efficiencies.

The unreacted propylene oxide is recovered, and may be recycled over the catalyst to produce additional allyl alcohol. The allyl alcohol may be recovered by distillation. Water may be added to remove the allyl alcohol as a constant boiling mixture of the alcohol and water. The water may later be removed by any of the known methods for drying alcohols, such as by distillation with benzene or diisopropyl ether. The purity of the allyl alcohol produced may be as high as 98.5% or higher, measured by bromination.

The catalyst may be prepared by mixing an aqueous solution of a soluble lithium salt, such as lithium chloride or lithium nitrate with an aqueous solution of a water-soluble tertiary alkali metal phosphate, such as trisodium phosphate, and precipitating the lithium phosphate, which is only very slightly soluble in water. The precipitate is preferably a hydrate of trilithium phosphate. There is some indication that catalysts formed from precipitates of relatively fine particle size, have a higher activity and greater mechanical strength. The precipitates are filtered and thoroughly washed to remove impurities. The filter cake may be extruded while wet into rods, which are later dried and broken up into particles of the desired size. Alternatively, the filter cake may be dried and crushed, the particles of the most appropriate size depending on the diameter of the reaction tube being separated by screening. If desired, the lithium phosphate may be precipitated on an inert supporting material. An inert supporting material is one, which itself, does not catalyze undesired isomerizations of propylene oxide.

The resulting catalyst is rugged and it has been operated for days before its activity, as measured by the production rate of allyl alcohol, declines appreciably. The catalyst is not unduly sensitive to poisoning, although it is best to distill the propylene oxide before passing it over the catalyst to remove any residual amounts of chlorine compounds as completely as practicable. When the activity of the catalyst declines to an uneconomic level of activity, it may be regenerated by passing oxygen, either undiluted or mixed with nitrogen (i. e., air) or steam, or a combination of air and steam, or undiluted oxygen and steam over the catalyst at a temperature of 250° to 350° C. The catalyst may be regenerated many times in this manner, and its original activity restored.

The following examples will serve to illustrate the invention.

EXAMPLE 1

A. Preparation of the catalyst

To 360 grams of 70% nitric acid, 150 grams of lithium carbonate ($Li_2CO_3$) were added in small portions. When the evolution of carbon dioxide had subsided, the solution was diluted to a volume of 1500 c. c. and filtered. Another solution was prepared by dissolving 762 grams of trisodium phosphate ($Na_3PO_4.12H_2O$) and 40 grams of sodium hydroxide in water and diluting to a volume of 2200 c. c. The temperature of both solutions was then adjusted to about 40° C. and the solution of lithium nitrate was quickly poured into the solution of sodium phosphate. The resulting precipitate was filtered and washed very thoroughly. The filter cake was dried overnight in an oven, then crushed and screened to a particle size of 4 x 8 mesh.

B. Production of allyl alcohol

Two hundred cubic centimeters (200 c. c.) of the above catalyst were packed in an electrically heated one inch inner diameter steel tube having a jacket for heat control containing tetrahydronaphthalene. Over a period of 8.5 hours there was vaporized over the catalyst 1765 c. c. of propylene oxide containing 1% water (measured at 25° C. equal to 1455 grams), while the catalyst temperature was maintained at 245° to 250° C. There was obtained 1394 grams of condensible material from the tube containing 250 grams of allyl alcohol, 7.2 grams of 3-carbon carbonyl compounds, 1064 grams of unchanged propylene oxide, and 14 grams of water from the feed material, the balance being unaccounted for. The yield of allyl alcohol was 17.2%. Of the propylene oxide consumed or not recovered, 67% was converted to allyl alcohol and 1.9% was converted to 3-carbon carbonyl compounds. The production rate of allyl alcohol was 147 grams per liter of catalyst per hour.

EXAMPLE 2

A catalyst similar to that described above, which had already operated for 151 hours in a glass tube with dry propylene oxide at allyl alcohol efficiencies of 77.2 to 83.7% was transferred to a one inch, jacketed steel tube. Operation was resumed with a propylene oxide feed containing 1% water. The operating temperature was maintained at 245° to 250° C., except for the last few hours, when a temperature of 255° C. was used. The original activity of the catalyst was indicated by a production rate of 150 grams of allyl alcohol per liter of catalyst per hour in a glass tube. After 128 hours of further operation, the activity of the catalyst began to decline, as shown by the details of the subsequent runs below.

| Run | F | G | I | J | K |
|---|---|---|---|---|---|
| Time for run_____hours__ | 24.5 | 15.5 | 22.5 | 22 | 18.5 |
| Catalyst time on stream at end of run_____hours__ | 128 | 143.5 | 173.5 | 195.4 | 214 |
| Average feed rate, c. c. of liquid propylene oxide per liter of catalyst per hour____ | 1,070 | 1,060 | 1,050 | 1,060 | 1,090 |
| Propylene oxide, reacted per cent__ | | 13.4 | 10.7 | | |
| Efficiency to allyl alcohol per cent__ | | 81.8 | 82.0 | | |
| Efficiency to acetone and propionaldehyde_____per cent__ | | 2.7 | 3.6 | | |
| Production rate, grams of alcohol per liter of catalyst per hour_____ | 124 | 96.5 | 71.0 | 61 | 60 |

The propylene oxide feed was then shut off and regeneration of the catalyst was accomplished by passing air over it at 295° to 310° C. for about 14 hours, followed by undiluted oxygen at 300° to 325° C. for an additional 14 hours. Carbon dioxide and water were given off during the catalyst activation, indicating that the catalyst had become fouled in operation with organic matter or carbon and organic matter.

After regeneration, operation was resumed at 245° to 250° C. with propylene oxide containing 1% water. The activity of the catalyst was more than restored in this instance, as shown by the data below:

| Run | A | B | C |
|---|---|---|---|
| Time for run_____hours__ | 7.8 | 17.7 | 14.5 |
| Catalyst time on stream at end of run___do____ | 7.8 | 25.5 | 40 |
| Average feed rate, c. c. of liquid propylene oxide per liter of catalyst per hour_____ | 1,070 | 1,030 | 1,080 |
| Propylene oxide, reacted_____per cent__ | 24.5 | 24.5 | 23.6 |
| Efficiency to allyl alcohol_____do____ | 70.5 | 84.1 | 87.2 |
| Efficiency to acetone and propionaldehyde per cent__ | 3.5 | 4.0 | 3.6 |
| Production rate, grams of alcohol per liter of catalyst per hour_____ | 142 | 170 | 179 |

EXAMPLE 3

A cyclic system was installed wherein the products from the converter were distilled and the propylene oxide recovered was recycled over the catalyst. A cut containing propionaldehyde was removed as the next component in the distillation, and water was added to separate the allyl alcohol from the residue as a constant boiling mixture of water and allyl alcohol.

The trilithium phosphate catalyst was prepared from lithium chloride and trisodium phosphate, and thoroughly washed to remove chloride. The converter consisted of a one inch steel tube having a jacket filled with tetrahydronaphthalene. The original feed material was commercially dry propylene oxide. The results are tabulated below:

| | |
|---|---|
| Average temperature, °C_____ | 245 |
| Time, hours_____ | 19.3 |
| Volume of catalyst, c. c_____ | 200 |
| Weight of catalyst, grams_____ | 87 |
| Feed rate, liquid propylene oxide, c. c. per hour _____ | 187 |
| Propylene oxide reacted, per cent per pass _____ | 30.6 |
| Propylene oxide reacted, per cent overall___ | 60.9 |
| Recovered propylene oxide, grams_____ | 588 |
| Allyl alcohol made, grams _____ | 655 |
| Efficiency to allyl alcohol, per cent_____ | 71.5 |
| Production rate, grams alcohol per liter of catalyst per hour_____ | 170 |

The foregoing examples are given to illustrate the preferred conditions for making allyl alcohol from propylene oxide, but the invention is not to be limited thereto.

We claim:

1. Process for making allyl alcohol which comprises passing propylene oxide vapors over a catalyst composed of trilithium phosphate at a temperature between about 200° and about 300° C., and recovering allyl alcohol from the effluent products.

2. Process for making allyl alcohol which comprises passing propylene oxide vapors over a catalyst composed of lithium phosphate at a temperature between about 200° and about 300° C., recovering allyl alcohol and unchanged propylene oxide from the effluent products, and recycling the unchanged propylene oxide over the catalyst to form additional amounts of allyl alcohol.

3. Process for making allyl alcohol which comprises passing propylene oxide vapors over a catalyst composed of lithium phosphate at a temperature between about 200° and about 300° C. until the activity of the catalyst has declined, thereafter blowing oxygen over the catalyst at a higher temperature than its previous operating temperature, cooling the catalyst and resuming the passage of propylene oxide vapors over the catalyst at a temperature between about 200° and about 300° C.

4. Process for making allyl alcohol which comprises passing the vapors of propylene oxide over a catalyst composed of trilithium phosphate at a temperature between about 240° and about 255° C.

GEORGE W. FOWLER.
JOHN T. FITZPATRICK.

REFERENCES CITED

The following references are of record in the file of this patent:

UNITED STATES PATENTS

| Number | Name | Date |
|---|---|---|
| 2,159,507 | Law | May 23, 1939 |